US 10,702,810 B2

(12) United States Patent
Ishizuka

(10) Patent No.: US 10,702,810 B2
(45) Date of Patent: Jul. 7, 2020

(54) FILTER DEVICE

(71) Applicant: YAMASHIN-FILTER CORP., Kanagawa (JP)

(72) Inventor: Makoto Ishizuka, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 16/388,390

(22) Filed: Apr. 18, 2019

(65) Prior Publication Data

US 2019/0240599 A1     Aug. 8, 2019

Related U.S. Application Data

(63) Continuation of application No. PCT/JP2017/038283, filed on Oct. 24, 2017.

(30) Foreign Application Priority Data

Oct. 31, 2016  (JP) .................................. 2016-213704

(51) Int. Cl.
*B01D 35/027*     (2006.01)
*B01D 29/11*      (2006.01)
(Continued)

(52) U.S. Cl.
CPC .......... *B01D 35/027* (2013.01); *B01D 24/00* (2013.01); *B01D 24/10* (2013.01); *B01D 29/00* (2013.01);
(Continued)

(58) Field of Classification Search
CPC ................ B01D 29/21; B01D 35/0276; B01D 2201/302; B01D 29/11; B01D 29/07;
(Continued)

(56) References Cited

U.S. PATENT DOCUMENTS

| 3,262,564 A | 7/1966 | Pall et al. |
| 2015/0083655 A1 | 3/2015 | Morishita et al. |
| 2017/0298965 A1 | 10/2017 | Vigholm |

FOREIGN PATENT DOCUMENTS

| JP | 2006-007140 A | 1/2006 |
| JP | 2007-296492 A | 11/2007 |

(Continued)

OTHER PUBLICATIONS

International Search Report issued in PCT/JP2017/038283 dated Jan. 30, 2018 with English Translation (4 pages).
(Continued)

*Primary Examiner* — Lucas A Stelling
*Assistant Examiner* — Angel Olivera
(74) *Attorney, Agent, or Firm* — Nakanishi IP Associates, LLC

(57) ABSTRACT

When air inside a filter device is purged, filtered liquid can be discharged together with air to the outside of the filter device. A casing is provided inside a tank, a filter element is provided inside the casing, and a lid is provided so as to cover the upper face of the casing and the upper face of the tank. A first through-hole is formed in the substantially center of an upper plate that covers the upper end face of a filtration member of a filter element and is abutted with the lower face of the lid; in a plan view, a second through-hole, in which a first opening being one end is disposed at a position overlapped with the first through-hole, and a second opening being the other end is disposed between the side face of the tank and the side face of the casing, is formed in the lid; and the first through-hole and the second through-hole communicate with the hollow portion of the filtration member and space that is inside the tank and outside the casing.

4 Claims, 5 Drawing Sheets

(51) Int. Cl.
  *B01D 29/00* (2006.01)
  *B01D 24/10* (2006.01)
  *B01D 29/21* (2006.01)
  *B01D 24/00* (2006.01)
  *B01D 29/07* (2006.01)

(52) U.S. Cl.
  CPC .............. *B01D 29/07* (2013.01); *B01D 29/11* (2013.01); *B01D 29/21* (2013.01); *B01D 35/0276* (2013.01); *B01D 2201/302* (2013.01)

(58) Field of Classification Search
  CPC ...... B01D 29/00; B01D 24/00; B01D 35/027; B01D 24/10
  See application file for complete search history.

(56) References Cited

FOREIGN PATENT DOCUMENTS

| | | |
|---|---|---|
| JP | 2010-149007 A | 7/2010 |
| JP | 2013-000608 A | 1/2013 |
| JP | 2013-234581 A | 11/2013 |
| WO | 2016/053151 A1 | 4/2016 |
| WO | 2016/116838 A1 | 7/2016 |

OTHER PUBLICATIONS

Extended European Search Report issued in European Patent Application No. 17865649.2, dated Nov. 8, 2019 (7 pages).

FILTER DEVICE

CROSS-REFERENCE TO RELATED APPLICATIONS

This application is a continuation application of International Patent Application No. PCT/JP2017/038283 filed on Oct. 24, 2017, which claims priority to Japanese Patent Application No. 2016-213704 filed on Oct. 31, 2016, the entire contents of which are incorporated by reference.

TECHNICAL FIELD

The present invention relates to a filter device.

BACKGROUND ART

Patent Document 1 discloses a filter device that includes an inflow pipe provided in a tangential direction with respect to the circumferential wall surface of a cylindrical main body container with a vertically disposed central axis and configured to introduce liquid containing an object to be separated, a cylindrical filter element disposed coaxially with the main body container in the main body container and configured to remove foreign matter contained in the liquid, an outflow pipe through which the liquid filtered by the filtration element flows out, and a bubble discharging pipe provided on the upper portion side of the main body container in a tangential direction with respect to the circumferential wall surface of the main body container and configured to discharge bubbles contained in the liquid together with the liquid.

CITATION LIST

Patent Document

Patent Document 1: JP 2007-296492 A

Generally, purified liquid after being filtered by a filter device (e.g., return filter) is stored in a tank, and liquid containing dust before filtration is not mixed. However, in the invention disclosed in Patent Document 1, the liquid before filtration is discharged together with bubbles (air) out of the filter device, and thus the liquid is discharged into the tank before filtration, and the liquid containing dust before filtration might be mixed in the purified liquid after filtration.

SUMMARY OF INVENTION

One or more embodiments of the present invention provide a filter device capable of discharging filtered liquid together with air out of the filter device when air inside the filter device is purged.

A filter device according to one or more embodiments of the present invention is, for example, provided in a tank and includes a casing provided inside the tank and having a substantially bottomed cylindrical shape; an inflow portion configured to cause liquid to flow into the casing; a lid covering an upper face of the casing and an upper face of the tank; a filter element provided inside the casing and including a filtration member that has a substantially hollow cylindrical shape, a lower plate covering a lower end face of the filtration member, and an upper plate covering an upper end face of the filtration member and being abutted with a lower face of the lid; and an outflow portion provided in such a manner as to penetrate the lower plate and a bottom face of the casing and communicate with a hollow portion of the filtration member and an inside of the tank.

A first through-hole is formed in a substantially center of the upper plate, in a plan view, a second through-hole, in which a first opening being one end is disposed at a position overlapped with the first through-hole, and a second opening being the other end is disposed between a side face of the tank and a side face of the casing, is formed in the lid, and the first through-hole and the second through-hole communicate with the hollow portion of the filtration member and space that is inside the tank and outside the casing.

In other words, the first through-hole is formed in a substantially center of the upper plate and the second through-hole is formed in the lid. The second through-hole has the first opening and the second opening at two ends thereof, respectively, such that the second through-hole communicates with the first through-hole via the first opening and communicates with the space outside the casing at an inside of the tank.

In accordance with the filter device according to one or more embodiments of the present invention, the casing is provided inside the tank, the filter element is provided inside the casing, and the lid is provided so as to cover the upper face of the casing and the upper face of the tank. The first through-hole is formed in the substantially center of the upper plate that covers the upper end face of the filtration member of the filter element and is abutted with the lower face of the lid; in a plan view, the second through-hole, in which the first opening being one end is disposed at a position overlapped with the first through-hole, and the second opening being the other end is disposed between the side face of the tank and the side face of the casing, is formed in the lid; and the first through-hole and the second through-hole communicate with the hollow portion of the filtration member and the space that is inside the tank and outside the casing. Thus, when air inside the filter device is purged, filtered liquid can be discharged together with air out of the filter device.

Herein, the second through-hole may have a substantially U-shape that includes a first portion including the first opening, a second portion including the second opening, and a coupling portion coupling the first portion with the second portion, and the second opening may be disposed in a vicinity of an outer circumferential face of the casing, and an angle formed between a central axis of the second portion and the outer circumferential face of the casing may be an acute angle. Thus, the hydraulic oil that has flown out with the air can be flown into the interior of the tank along the outer circumferential face of the casing. Consequently, the hydraulic oil stored in the tank is prevented from bubbling.

Herein, the second through-hole may have a substantially U-shape that includes a first portion including the first opening, a second portion including the second opening, and a coupling portion coupling the first portion with the second portion, and the second opening may be disposed at a position abutted with an outer circumferential face of the casing, and a central axis of the second portion and the outer circumferential face of the casing may be substantially parallel. Thus, the hydraulic oil that has flown out with the air can be flown into the interior of the tank along the outer circumferential face of the casing. Consequently, the hydraulic oil stored in the tank is prevented from bubbling.

According to one or more embodiments of the resent invention, when air is purged, the filtered liquid can be discharged together with the air out of the filter device.

DESCRIPTION OF EMBODIMENTS

Detailed description of embodiments of the present invention will be given with reference to drawings below. A filter device according to the present invention will be described below using a return filter provided in the interior of a hydraulic oil tank as an example, and the present invention can be applied to various filter devices other than the return filter.

First Embodiment

Figure 1:
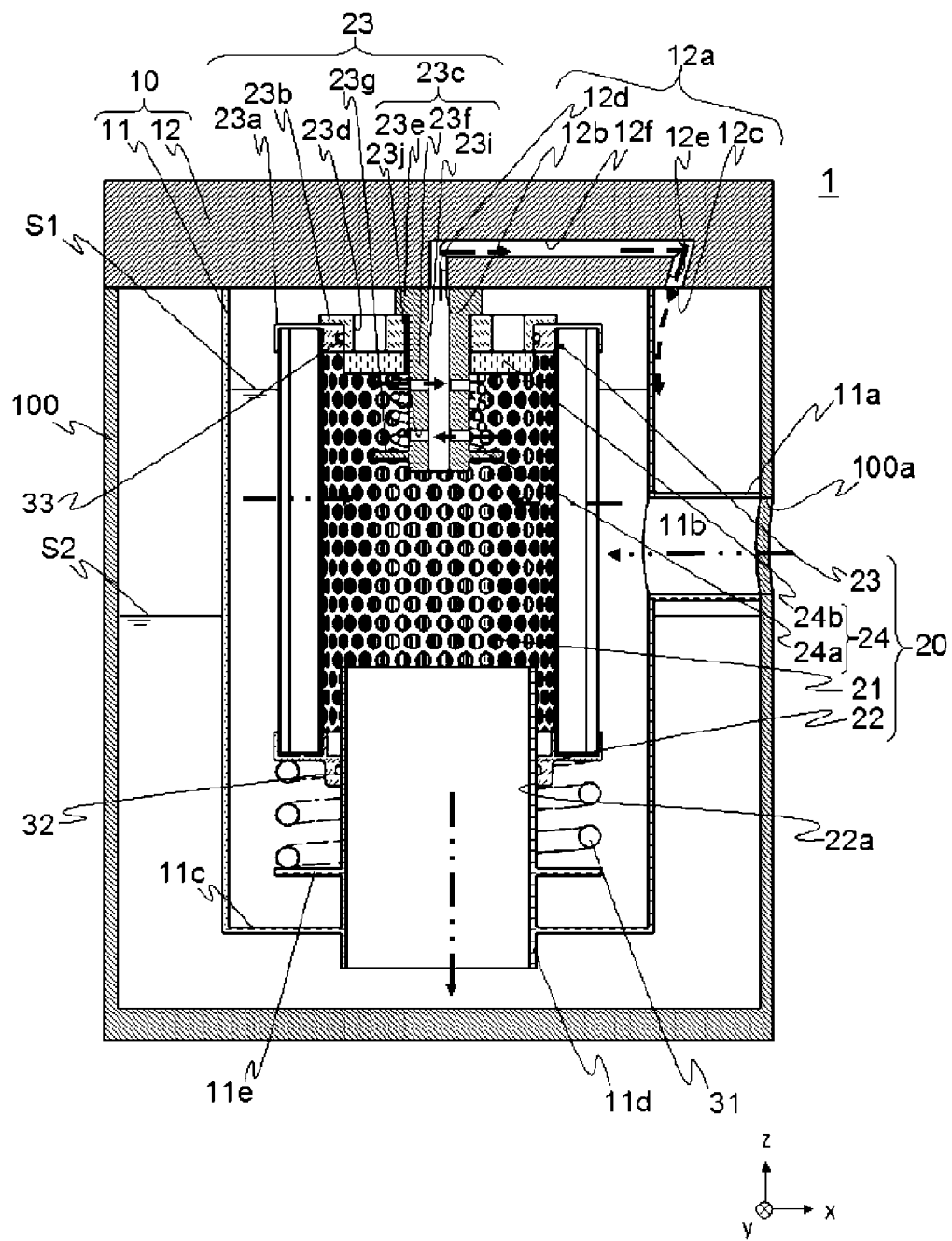
FIG. 1 is a cross-sectional view of an essential part illustrating an overview of a tank 100 in which a return filter 1 according to a first embodiment of the present invention is provided.
Figure 2:
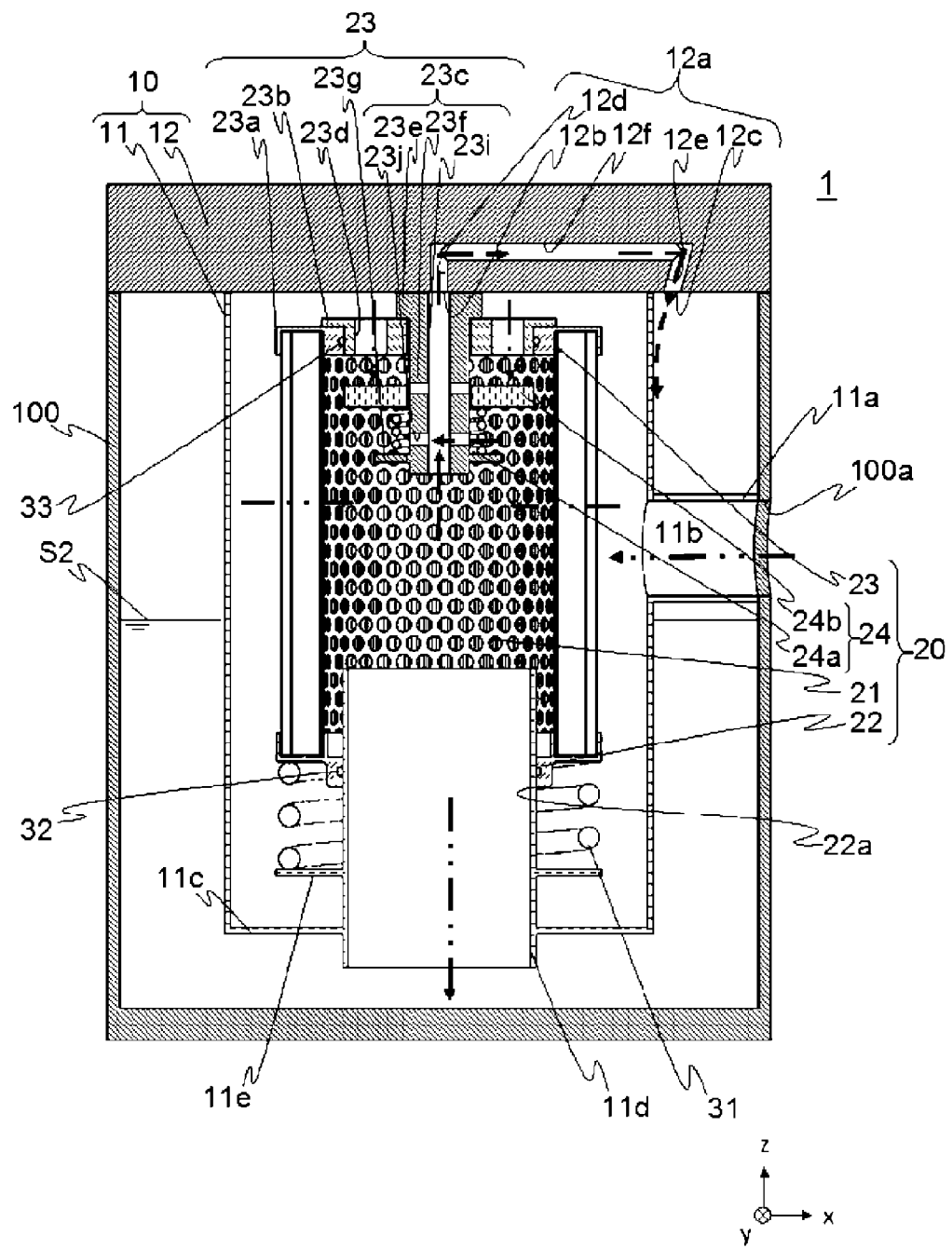
FIG. 2 is a cross-sectional view of an essential part illustrating an overview of the tank 100 in which the return filter 1 is provided.

FIGS. 1 and 2 are cross-sectional views of an essential part illustrating the overview of a tank 100 in which a return filter 1 according to a first embodiment of the present invention is provided.

The tank 100 is installed in a work machine not illustrated (e.g., a hydraulic device), and is provided in a hydraulic circuit of hydraulic oil supplied to the hydraulic device and configured to store the hydraulic oil. However, the tank 100 is not limited to one provided in the hydraulic circuit. In addition, the tank 100 may store liquid other than the hydraulic oil.

The tank 100 is, for example, formed in a box-like shape and hollow inside. The return filter 1 is mainly provided in the tank 100.

An inflow port 100a that allows the hydraulic oil to flow into the inside of the return filter 1 is formed on a side face of the tank 100. An inflow pipe 11a (described later) is inserted into the inflow port 100a. The hydraulic oil introduced into the return filter 1 via the inflow pipe 11a is filtered by the return filter 1 and stored in the tank 100.

An outflow port not illustrated that allows the hydraulic oil in the tank 100 to flow out to a hydraulic pump (not illustrated) or the like is formed in the vicinity of a lower end portion of the tank 100.

The return filter 1 mainly includes a container 10 and a filter element 20.

The container 10 is formed of a material having high corrosion resistance (e.g., metal such as stainless steel, or resin). The container 10 mainly includes a casing 11 and a lid 12.

The casing 11 has a substantially bottomed cylindrical shape and is provided inside the tank 100. The casing 11 is hollow inside and mainly provided with the filter element 20 in the interior thereof.

The lid 12 is a substantially plate-like member that covers an upper face of the casing 11 and an upper face of the tank 100. The lid 12 is fixed on the tank 100 with screws or the like. A through-hole 12a (described later) is formed in the lid 12.

On the side face of the casing 11, an inflow portion that allows liquid (herein, hydraulic oil) to flow into the container 10 is formed on the side face. The inflow portion mainly includes the inflow pipe 11a, and the hollow portion of the inflow pipe 11a is integrated with a hole 11b formed on the side face of casing 11.

An outflow pipe 11d that causes the filtered hydraulic oil to flow out of the container 10 is formed on a bottom face 11c of the casing 11. The outflow pipe 11d has a substantially cylindrical shape and communicates with the hollow portion of the filter element 20. A plate portion 11e that holds an elastic member 31 is formed on the outflow pipe 11d.

Next, the filter element 20 will be described. The filter element 20 is a member having a substantially cylindrical shape and is provided inside the container 10. The filter element 20 mainly includes a filtration member 21, plates 22 and 23, and a valve 24. Note that the valve 24 is not necessarily required.

The filtration member 21 is a member having a substantially hollow cylindrical shape and includes openings at both ends. The filtration member 21 is formed by pleating a filter paper such as synthetic resin or paper, and connecting both ends of the pleated filter paper to form a cylindrical shape. Note that an inner tube (not illustrated), in which holes configured to allow the hydraulic oil to pass are formed on a substantially entire area, may be provided on the inner side of the filtration member 21.

The plate 22 is provided at an end on the lower side of the filtration member 21, and the plate 23 is provided at an end on the upper side of the filtration member 21. The plate 22 and the plate 23 are members having a substantially disc shape or a substantially bottomed cylindrical shape, and are formed of resin or metal. The plate 22 covers the lower end face of the filtration member 21, and the plate 23 covers the upper end face of the filtration member 21. In other words, the plates 22 and 23 sandwich the filtration member 21.

An opening portion 22a is formed in the center of the plate 22, and the outflow pipe 11d is inserted into the opening portion 22a. In other words, the outflow pipe 11d is provided so as to penetrate the plate 22 and the bottom face 11c. This allows the outflow pipe 11d to communicate the hollow portion of the filter element 20 (the hollow portion of the filtration member 21) with an external space of the container 10 (herein, space inside the tank 100). Space between the opening portion 22a and the outflow pipe 11d is sealed by a sealing member 32 such as a gasket.

An elastic member 31 is provided between the plate 22 and the plate portion 11e. The elastic member 31 is a coil spring, for example, and presses the plate 22, that is, the filter element 20 upward (in the +z direction). As a result, the filter element 20 is held inside the container 10.

The plate 23 mainly includes a first plate 23a, a second plate 23b, and a cylindrical portion 23c.

The first plate 23a has a substantially hollow disc shape, and the second plate 23b is inserted into a hollow portion. Note that space between the first plate 23a and the second plate 23b is sealed by a sealing member 33 such as a gasket.

The second plate 23b has a substantially hollow disc shape, and the cylindrical portion 23c is inserted into a hollow portion. An opening portion 23d is formed in the second plate 23b.

The cylindrical portion 23c includes a flange portion 23e with a large diameter and a pipe portion 23f with a small diameter, and the pipe portion 23f is inserted into the hollow portion of the second plate 23b. The upper face (face on +z side) of the flange portion 23e is abutted with the lower face (face on −z side) of the lid 12. The biasing force of the elastic member 31 causes the upper face of the second plate 23b to be pressed against the lower face of the flange portion 23e and causes the upper face of the flange portion 23e to be pressed against the lower face of the lid 12.

A through-hole 23i is formed substantially in the center of the cylindrical portion 23c. The through-hole 23i is formed in such a manner as to penetrate the cylindrical portion 23c along the central axis of the cylindrical portion 23c. In addition, a through-hole 23j is formed in the cylindrical portion 23c along the radial direction. The through-hole 23j penetrates the cylindrical portion 23c in such a manner that one end thereof is exposed to the outer circumferential face of the cylindrical portion 23c and the other end thereof is exposed to the through-hole 23i. The through-hole 23i and the through-hole 23j, as well as the through-hole 12a form an air discharging portion (described in detail later) for discharging air or filtered liquid to the outside. However, the through-hole 23j is not necessarily required.

The valve 24 is provided in a plate portion 23g formed in the pipe portion 23f. The valve 24 mainly includes an elastic member 24a and a plate 24b. The plate 24b is provided on the lower side of the second plate 23b so as to cover the opening portion 23d.

Normally, as illustrated in FIG. 1, the valve 24 is closed, and thus the upper face of the plate 24b is abutted with the lower face of the second plate 23b. When pressure inside the casing 11 increases as the filtration member 21 is clogged, an oil face S1 rises, and the inside of the casing 11 is filled with the hydraulic oil. Then, as illustrated in FIG. 2, the second plate 23b and the plate 24b separate from each other, and the valve 24 opens. As a result, the hydraulic oil flows from the opening portion 23d into the inside of the filtration member 21, which prevents the damage of the return filter 1 (see an arrow in a long dashed line in FIG. 2).

Next, the air discharging portion will be described in detail. The through-hole 12a formed in the lid 12 has a substantially U-shape (substantially C-shape), and both ends thereof are openings 12b and 12c. The through-hole 12a includes a first portion 12d including an opening 12b, a second portion 12e including an opening 12c, and a coupling portion 12f that couples the first portion 12d with the second portion 12e.

In a plan view (when viewed from +z direction), one opening 12b of the through-hole 12a is disposed at a position overlapped with the through-hole 23i. Thus, the first portion 12d and the through-hole 23i communicates with each other.

In a plan view, the other opening 12c of the through-hole 12a is disposed between the side face of the tank 100 and the side face of the casing 11. Consequently, the through-hole 23i, the through-hole 23j, and the through-hole 12a communicate the hollow portion of the filtration member 21 with space that is inside the tank 100 and outside the casing 11.

In the present embodiment, the opening 12c is disposed in the vicinity of the outer circumferential face of the casing 11. In addition, an angle formed between the central axis of the second portion 12e and the outer circumferential face of the casing 11 is an acute angle.

Next, the functionality of the return filter 1 thus configured will be described. Arrows in chain double-dashed lines in FIGS. 1 and 2 indicate the flow of the hydraulic oil inside the return filter 1.

The hydraulic oil that has flown from the inflow pipe 11a flows into the interior of the casing 11. The hydraulic oil that has flown in is stored in the interior of the casing 11. The oil face S1 rises in accordance with an amount of hydraulic oil stored, and when the oil face S1 becomes higher than the plate 22, the hydraulic oil flows from the outside to the inside of the filtration member 21, and the filtered hydraulic oil flows into the inside of the filtration member 21. The filtered hydraulic oil flows out from the outflow pipe 11d into the tank 100.

A section above the oil face S1 inside the casing 11 and the filtration member 21 is filled with air. With an ascent of the oil face S1, air is discharged from the interior of the return filter 1 into the tank 100 through the through-hole 23i, the through-hole 23j, and the through-hole 12a.

When the oil face S1 further rises, and the interior of the casing 11 is filled with the hydraulic oil, filtered liquid is discharged together with air from the interior of the return filter 1 into the tank 100 through the through-hole 23i, the through-hole 23j, and the through-hole 12a. The opening 12c is disposed in the vicinity of the outer circumferential face of the casing 11, and an angle formed between the central axis of the second portion 12e and the outer circumferential face of the casing 11 is an acute angle, and thus the filtered liquid that has flown out from the opening 12c collides with the outer circumferential face of the casing 11 and flows downward along the outer circumferential face.

According to the present embodiment, the filtered liquid can be discharged together with air out of the return filter 1 (that is, the interior of the tank 100). Thus, when air is purged, the hydraulic oil that has not been filtered is not mixed into the tank 100, even when the hydraulic oil flows out from the return filter 1 to the tank 100. In addition, in the present embodiment, the hydraulic oil that has flown out with the air flows in the interior of the tank 100 along the outer circumferential face of the casing 11, so that the hydraulic oil stored in the tank 100 can be prevented from bubbling.

Second Embodiment

In the first embodiment, the angle formed between the central axis of the second portion 12e of the through-hole 12a and the outer circumferential face of the casing 11 is an acute angle, but the form of the through-hole that communicates the hollow portion of the filtration member 21 with the space that is inside the tank 100 and outside the casing 11 is not limited to this.

Figure 3:
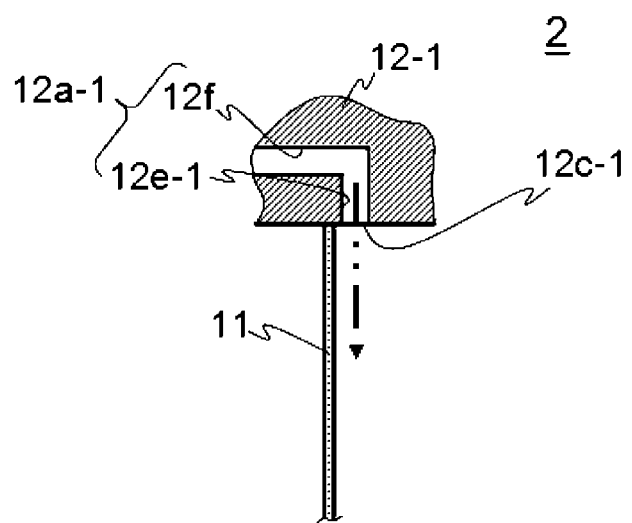
FIG. 3 is a cross-sectional view illustrating an overview of a return filter 2 according to a second embodiment, which is partially enlarged.

In a second embodiment, the central axis of the second portion and the outer circumferential face of the casing 11 are substantially parallel. FIG. 3 is a cross-sectional view illustrating an overview of a return filter 2 according to the second embodiment, which is partially enlarged. Note that the same components as those of the return filter 1 are denoted using the same reference numerals, and descriptions thereof will be omitted.

A lid 12-1 is a substantially plate-like member that covers the upper face of the casing 11 and the upper face of the tank 100. A through-hole 12a-1 is formed in the lid 12-1. The through-hole 23i and the through-hole 23j (not illustrated in FIG. 3), as well as the through-hole 12a-1 (partially not illustrated in FIG. 3) form an air discharging portion for discharging air or filtered liquid to the outside and communicate the hollow portion of the filtration member 21 and the space that is inside the tank 100 and outside the casing 11.

The through-hole 12a-1 has a substantially U-shape (substantially C-shape), and both ends thereof are openings 12b (not illustrated in FIG. 3) and 12c-1. In a plan view, the opening 12c-1 is disposed at a position abutted with the outer circumferential face of the casing 11. A second portion 12*e*-1 including the opening 12*c*-1 has a central axis in substantially parallel to the outer circumferential face of the casing 11.

The opening 12*c*-1 is disposed at a position closer to the outer circumferential face of the casing 11 than the opening 12*c* of the return filter 1, that is, a position abutted with the outer circumferential face of the casing 11.

Thus, when air or filtered liquid is discharged to the outside, the filtered liquid that has flown out from the opening 12*c*-1 can be allowed to flow downward along the outer circumferential face of the casing 11.

Note that, in a plan view, it is preferable that the opening 12*c*-1 be disposed in such a manner that the position of the opening 12*c*-1 substantially corresponds to the position of the outer circumferential face of the casing 11. This allows the filtered liquid that has flown out from the opening 12*c*-1 to steadily flow along the outer circumferential face of the casing 11.

Third Embodiment

In the first embodiment, the air and the filtered hydraulic oil are discharged from the opening 12*c* of the through-hole 12*a*, but the form of the through-hole is not limited to this.

Figure 4:
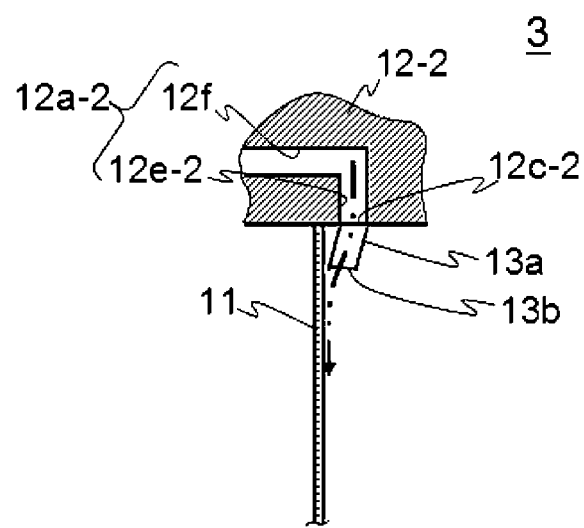
FIG. 4 is a cross-sectional view illustrating an overview of a return filter 3 according to a third embodiment, which is partially enlarged.

In a third embodiment, a pipe is provided at the leading end of a through-hole. FIG. 4 is a cross-sectional view illustrating an overview of a return filter 3 according to the third embodiment, which is partially enlarged. Note that the same components as those of the return filter 1 are denoted using the same reference numerals, and descriptions thereof will be omitted.

A lid 12-2 is a substantially plate-like member that covers the upper face of the casing 11 and the upper face of the tank 100. A through-hole 12*a*-2 is formed in the lid 12-2. The through-hole 12*a*-2 has a substantially U-shape (substantially C-shape), and both ends thereof are openings 12*b* (not illustrated in FIG. 4) and 12*c*-2. A second portion 12*e*-2 including the opening 12*c*-2 has a central axis in substantially parallel to the outer circumferential face of the casing 11. Note that an angle formed between the central axis of the second portion 12*e*-2 and the outer circumferential face of the casing 11 may be an acute angle.

A pipe 13*a* coupled with the through-hole 12*a*-2 is provided on the lower face of the lid 12-2. The hollow portion of the pipe 13*a* corresponds to the opening 12*c*-2. Thus, the through-hole 23*i*, the through-hole 23*j* (not illustrated in FIG. 4), the through-hole 12*a*-2 (partially not illustrated in FIG. 4), and the pipe 13*a* form an air discharging portion for discharging air or filtered liquid to the outside and communicate the hollow portion of the filtration member 21 with the space that is inside the tank 100 and outside the casing 11.

An angle formed between the central axis of the pipe 13*a* and the outer circumferential face of the casing 11 is an acute angle. The position of the leading end 13*b* of the pipe 13*a* is abutted with the outer circumferential face of the casing 11.

Thus, the filtered liquid that has flown out from the leading end 13*b* collides with the outer circumferential face of the casing 11 and thereafter flows downward. This prevents the hydraulic oil stored in the tank 100 from bubbling.

Note that the leading end 13*b* and the outer circumferential face of the casing 11 may be abutted to cause the filtered liquid that has flown out from the leading end 13*b* to steadily collide with the outer circumferential face of the casing 11.

Fourth Embodiment

In the first embodiment, the lid 12 covers the casing 11 and the tank 100, and the through-hole 12*a* is formed in the lid 12, but the form of the lid is not limited to this.

Figure 5:
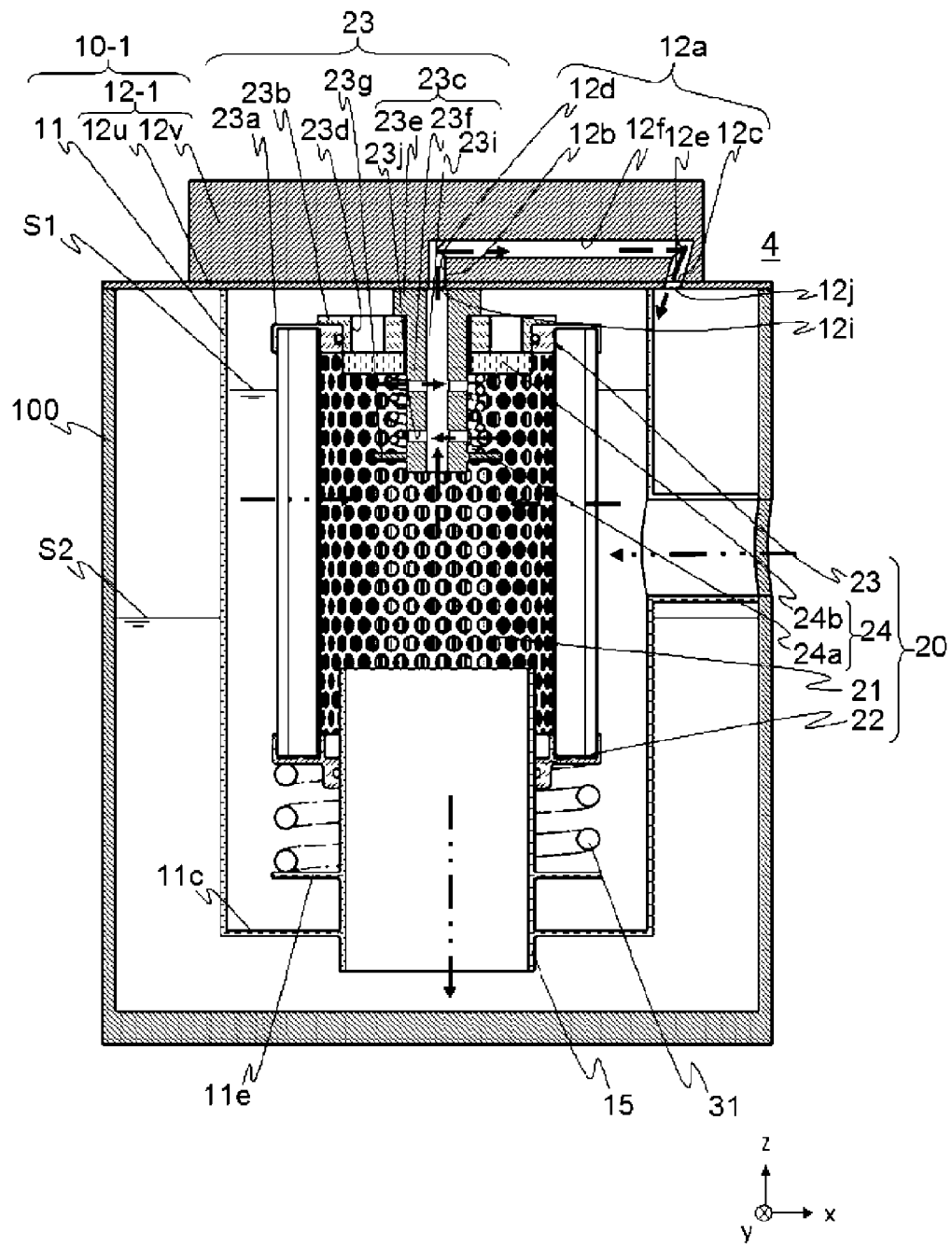
FIG. 5 is a cross-sectional view of an essential part illustrating an overview of the tank 100 in which a return filter 4 according to a fourth embodiment is provided.

In a fourth embodiment, a lid is composed of two components. FIG. 5 is a cross-sectional view of an essential part illustrating an overview of the tank 100 in which a return filter 4 according to the fourth embodiment is provided. Note that the return filter 4 is the same as the return filter 1 according to the first embodiment except for the lid, and thus the components that are the same as those of the filter element 1 are denoted using the same reference numerals, and descriptions thereof are omitted.

The return filter 4 mainly includes a container 10-1 and the filter element 20.

The container 10-1 is formed of a material having high corrosion resistance and mainly includes the casing 11 and a lid 12-1.

The lid 12-1 includes a substantially plate-like first lid 12*u* that covers the upper face of the casing 11 and the upper face of the tank 100, and a second lid 12*v* provided on the first lid 12*u*. The first lid 12*u* is fixed on the tank 100 with screws or the like, and the second lid 12*v* is fixed on the first lid 12*u* with screws or the like.

The through-hole 12*a* is formed in the second lid 12*v*. In a plan view, a hole 12*i* is formed in the first lid 12*u* at a position overlapped with the opening 12*b* and the through-hole 23*i*. In addition, in a plan view, a hole 12*j* is formed in the first lid 12*u* at a position overlapped with the opening 12*c*. Consequently, the through-hole 23*i*, the through-hole 23*j*, the through-hole 12*a*, the hole 12*i*, and the hole 12*j* form an air discharging portion for discharging air or filtered liquid to the outside and communicate the hollow portion of the filtration member 21 with the space that is inside the tank 100 and outside the casing 11.

According to the preset embodiment, when air is purged, the filtered liquid can be discharged together with the air out of the device. In addition, the second lid 12*v* in which the through-hole 12*a* is formed can be made small, so that the miniaturization and weight reduction of the return filter 4 can be achieved.

Embodiments of the invention have been described in detail with reference to the drawings. However, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

In addition, the term "substantially" is not to be understood as merely being strictly the same, and is a concept that includes errors and modifications to an extent that does not result in loss in identity. For example, the term "substantially orthogonal" is not limited to being strictly orthogonal, and is a concept that includes errors of several degrees, for example. Further, simple expressions such as orthogonal, parallel, and identical are not to be understood as merely being strictly orthogonal, parallel, identical, and the like, and include being substantially parallel, substantially orthogonal, substantially identical, and the like.

In addition, the term "vicinity" means to include a range of regions (which can be determined as desired) near a position serving as a reference. For example, the term "a vicinity of an end" refers to a range of regions near the end, and is a concept indicating that the end may or may not be included.

REFERENCE SIGNS LIST 1, 2, 3, 4 Return filter
10, 10-1 Container
11 Case
11a Inflow pipe
11b Hole
11c Bottom face
11d Outflow pipe
11e Plate portion
12, 12-1, 12-2 Lid
12a, 12a-1, 12a-2 Through-hole
12b, 12c, 12c-1, 12c-2 Opening
12d First portion
12e, 12e-1, 12e-2 Second portion
12f Coupling portion
12i, 12j Hole
12u First lid
12v Second lid
13a Pipe
13b Leading end
20 Filter element
21 Filtration member
22, 23 Plate
22a Opening portion
23a First plate
23b Second plate
23c Cylindrical portion
23d Opening portion
23e Flange portion
23f Pipe portion
23g Plate portion
23f Opening portion
23i Through-hole
23j Through-hole
24 Valve
24a Elastic member
24b Plate
31 Elastic member
32, 33 Sealing member
100 Hydraulic oil tank
100a Inflow port
100b Inflow pipe

The invention claimed is:
1. A tank and a filter device, the device comprising:
a tank; and
a filter device disposed in the tank;
the filter device comprising:
a casing disposed inside the tank and having a bottomed cylindrical shape;
an inflow portion configured to cause liquid to flow into the casing;
a lid covering an upper face of the casing and an upper face of the tank;
a filter element disposed inside the casing and including:
a filtration member that has a hollow cylindrical shape,
a lower plate covering a lower end face of the filtration member, and
an upper plate covering an upper end face of the filtration member and being abutted with a lower face of the lid; and
an outflow portion configured to penetrate the lower plate and a bottom face of the casing, such that a hollow portion of the filtration member communicates with a space between an outer surface of the casing and an inner surface of the tank,
where:
a first through-hole is formed in a substantially center of the upper plate;
a second through-hole is formed in the lid;
the second through-hole has a first opening and a second opening at two ends thereof, respectively; and
the second through-hole communicates with the first through-hole via the first opening and communicates with the space between the outer surface of the casing and the inner surface of the tank via the second opening;
where the second through-hole has a substantially U-shape and includes a first portion including the first opening, a second portion including the second opening, and a coupling portion coupling the first portion with the second portion,
the second opening is disposed in a vicinity of an outer circumferential face of the casing, and
a central axis of the second portion passing out of the lid through the second opening,
the central axis intersecting the outer circumferential surface of the casing and forming an angle between said central axis of the second portion and the outer circumferential face of the casing
where the angle is an acute angle.
2. A tank and a filter device, the device comprising:
a tank; and
a filter device disposed in the tank;
the filter device comprising:
a casing disposed inside the tank and having a bottomed cylindrical shape;
an inflow portion configured to cause liquid to flow into the casing;
a lid covering an upper face of the casing and an upper face of the tank;
a filter element disposed inside the casing and including:
a filtration member that has a hollow cylindrical shape,
a lower plate covering a lower end face of the filtration member, and
an upper plate covering an upper end face of the filtration member and being abutted with a lower face of the lid; and
an outflow portion configured to penetrate the lower plate and a bottom face of the casing, such that a hollow portion of the filtration member communicates with a space between an outer surface of the casing and an inner surface of the tank,
where:
a first through-hole is formed in a substantially center of the upper plate;
a second through-hole is formed in the lid;
the second through-hole has a first opening and a second opening at two ends thereof, respectively; and the second through-hole communicates with the first through-hole via the first opening and communicates with the space between the outer surface of the casing and the inner surface of the tank via the second opening;

where the second through-hole has a substantially U-shape and includes a first portion including the first opening, a second portion including the second opening, and a coupling portion coupling the first portion with the second portion, the second opening is disposed at a position abutted with an outer circumferential face of the casing, and a central axis of the second portion passing out of the lid through the second opening, the central axis being parallel to the outer circumferential face of the casing.

3. The tank and filter device according to claim 1, wherein the first through-hole and the second through-hole comprises a fluid passage that allows fluid communication between the filter element and the space.

4. The tank and filter device according to claim 2, where the first through-hole and the second through-hole comprises a fluid passage that allows fluid communication between the filter element and the space.

* * * * *